(12) United States Patent
Park et al.

(10) Patent No.: US 8,346,027 B2
(45) Date of Patent: Jan. 1, 2013

(54) ELECTRO-OPTIC DEVICE

(75) Inventors: Jeong Woo Park, Daejeon (KR);
Jongbum You, Seongnam (KR);
Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 12/816,550

(22) Filed: Jun. 16, 2010

(65) Prior Publication Data
US 2011/0135243 A1   Jun. 9, 2011

(30) Foreign Application Priority Data

Dec. 9, 2009   (KR) .................. 10-2009-0121656

(51) Int. Cl.
*G02F 1/035* (2006.01)

(52) U.S. Cl. ............ 385/3; 385/1; 385/4; 385/8; 385/31

(58) Field of Classification Search .............. 385/1, 2, 385/3, 4, 8, 15, 31, 39, 45
See application file for complete search history.

(56) References Cited

U.S. PATENT DOCUMENTS

| | | | |
|---|---|---|---|
| 5,655,034 A | 8/1997 | Ishizaka et al. | |
| 6,304,690 B1 * | 10/2001 | Day | 385/24 |
| 6,933,583 B2 | 8/2005 | Kunkee et al. | |
| 7,116,853 B2 * | 10/2006 | Gunn et al. | 385/14 |
| 7,447,395 B2 | 11/2008 | Montgomery et al. | |
| 8,081,361 B2 * | 12/2011 | Stevens | 359/108 |
| 2006/0008223 A1 | 1/2006 | Gunn, III et al. | |

OTHER PUBLICATIONS

Ling Liao et al., "High speed silicon Mach-Zehnder modulator", Optics Express, Apr. 18, 2005, pp. 3129-3135, vol. 13, No. 8, 2005 Optical Society of America.

* cited by examiner

*Primary Examiner* — Jennifer Doan (57) ABSTRACT

Provided is an electro-optic device. The electro-optic device includes an input Y-branch comprising a first input branch and a second input branch, an output Y-branch comprising a first output branch and a second output branch, a first optical modulator and a second optical modulator connected in series between the first input branch and the first output branch, and a third optical modulator connecting the second input branch to the second output branch. The first optical modulator comprises a PIN diode, and each of the second optical modulator and the third optical modulator comprises a PN diode.

18 Claims, 4 Drawing Sheets

ELECTRO-OPTIC DEVICE

CROSS-REFERENCE TO RELATED APPLICATIONS

This U.S. non-provisional patent application claims priority under 35 U.S.C. §119 of Korean Patent Application No. 10-2009-0121656, filed on Dec. 9, 2009, the entire contents of which are hereby incorporated by reference.

BACKGROUND OF THE INVENTION

The present invention disclosed herein relates to an electro-optic device.

As semiconductor industries have been highly developed, semiconductor integrated circuits such as logic devices and memory devices are becoming more high speed and high integration. With the high speed and high integration of the semiconductor integrated circuits, a transmission speed between the semiconductor integrated circuits are directly linked with performance of electronic devices including the semiconductor integrated circuits. Typically, semiconductor integrated circuits receive/transmit data through electrical communication electrically receiving/transmitting data. For example, semiconductor integrated circuits are mounted on a printed circuit board (PCB) to electrically communicate with each other through interconnections disposed in the PCB.

With the high speed and integration of semiconductor devices, to increase a transmission speed between semiconductor chips, technologies using optical signals are being researched.

SUMMARY OF THE INVENTION

The prevent invention provides an electro-optic device having an improved operation speed.

The prevent invention also provides an electro-optic device optimized for high efficiency.

The prevent invention also provides an electro-optic device optimized for a high integration.

The prevent invention also provides an electro-optic device optimized for low power consumption.

Embodiments of the prevent invention provide electro-optic devices including: an input Y-branch comprising a first input branch and a second input branch; an output Y-branch comprising a first output branch and a second output branch; a first optical modulator and a second optical modulator connected in series between the first input branch and the first output branch; and a third optical modulator connecting the second input branch to the second output branch, wherein the first optical modulator comprises a PIN diode, and each of the second optical modulator and the third optical modulator comprises a PN diode.

In some embodiments, the first optical modulator may include: an optical modulation part comprising an intrinsic semiconductor part disposed on a substrate; and a first recess part and a second recess part connected to both sidewalls of the optical modulation part, respectively, the first and second recess parts having top surfaces lower than a top surface of the optical modulation part, wherein the first recess part may include a first conductive type first semiconductor part, and the second recess part may include a second conductive type second semiconductor part, wherein the intrinsic semiconductor part may contact a first conductive type doped region and a second conductive type doped region.

In other embodiments, when operated, a forward DC voltage may be applied between the first semiconductor part and the second semiconductor part.

In still other embodiments, the second optical modulator and the third optical modulator may have the same structure as each other.

In even other embodiments, the second optical modulator may include: an optical modulation part comprising a first conductive type first semiconductor part, a second conductive type second semiconductor part, and a depletion layer formed by a junction between the first semiconductor part and the second semiconductor part, which are disposed on a substrate; and a first recess part and a second recess part connected to a first sidewall and a second sidewall of the optical modulation part, respectively, the first and second recess parts having top surfaces lower than a top surface of the optical modulation part.

In yet other embodiments, a reverse bias voltage may be applied between the first semiconductor part and the second semiconductor part.

In further embodiments, a junction surface between the first semiconductor part and the second semiconductor part may be non-parallel to a top surface of the substrate.

In still further embodiments, the junction surface may be perpendicular to the substrate, and a distance between the junction surface and the first sidewall may be equal to that between the junction surface and the second sidewall.

In even further embodiments, the first semiconductor part and the second semiconductor part may be sequentially stacked on the substrate, and a junction surface between the first semiconductor part and the second semiconductor part may be parallel to the substrate.

In yet further embodiments, a distance between the junction surface and the top surface of the optical modulation part may be equal to that between the junction surface and a bottom surface of the optical modulation part.

In much further embodiments, the optical modulation part may further include: a first conductive type third semiconductor part spaced from the first semiconductor part with the second semiconductor part therebetween; and an additional depletion layer formed by a junction between the third semiconductor part and the second semiconductor part.

In still much further embodiments, a first junction surface between the first semiconductor part and the second semiconductor part and a second junction surface between the second semiconductor part and the third semiconductor part may be non-parallel to a top surface of the substrate.

In even much further embodiments, the first junction surface and the second junction surface may be perpendicular to the substrate, a reverse bias voltage may be applied to any one junction surface of the first junction surface and the second junction surface, and a distance between the any one junction surface and the first sidewall may be equal to that between the any one junction surface and the second sidewall.

In yet much further embodiments, the first semiconductor part, the second semiconductor part, and the third semiconductor part may be sequentially stacked on the substrate, and a first junction surface between the first semiconductor part and the second semiconductor part and a surface junction surface between the second semiconductor part and the third semiconductor part may be parallel to the substrate.

In yet much further embodiments, a reverse bias voltage may be applied to any one junction surface of the first junction surface and the second junction surface, a distance between the any one junction surface and the top surface of the optical modulation part may be equal to that between the any one junction surface and a bottom surface of the optical modulation part.

In yet much further embodiments, electro-optic devices may further include a first optical signal proceeding from the first input branch to the first output branch and a second optical signal proceeding from the second input branch to the second output branch, the first and second optical signals splitting at the input Y-branch, wherein, when operated, the first optical modulator may modulate a phase of the first optical signal by about 90 degrees.

In yet much further embodiments, a optical modulation part of the first optical modulator and a optical modulation part of the second optical modulator may be connected in series.

In yet much further embodiments, each of the first, second, and third optical modulator may include: an optical modulation part disposed on a substrate; a pair of recess parts connected to both sidewalls of the optical modulation part, respectively, the pair of recess parts having top surfaces lower than that of the optical modulation part; and a cladding layer disposed between the optical modulation part and the substrate, wherein a refractive index of the optical modulation part may be varied by a concentration of carriers within the optical modulation part.

In other embodiments of the prevent invention, electro-optic device include: an input Y-branch comprising a first input branch and a second input branch; an output Y-branch comprising a first output branch and a second output branch; a first optical modulator and a second optical modulator connected in series between the first input branch and the first output branch; and a third optical modulator connecting the second input branch to the second output branch, wherein the first optical modulator modulates a phase of an optical signal inputted into the first optical modulator by about 90 degrees, and the second and third optical modulators perform AC-modulation of a phase of an optical signal inputted the second and third optical modulator, respectively.

In some embodiments, the second optical modulator and the third optical modulator may have the same structure as each other.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Since preferred embodiments are provided below, the order of the reference numerals given in the description is not limited thereto. Also, in the figures, the dimensions of layers and regions are exaggerated for clarity of illustration. It will be understood that when an element such as a layer, film, region, or substrate is referred to as being "on" another element, it can be directly on the other element or intervening elements may also be present. Additionally, the embodiment in the detailed description will be described with sectional views as ideal exemplary views of the present invention.

Figure 1:
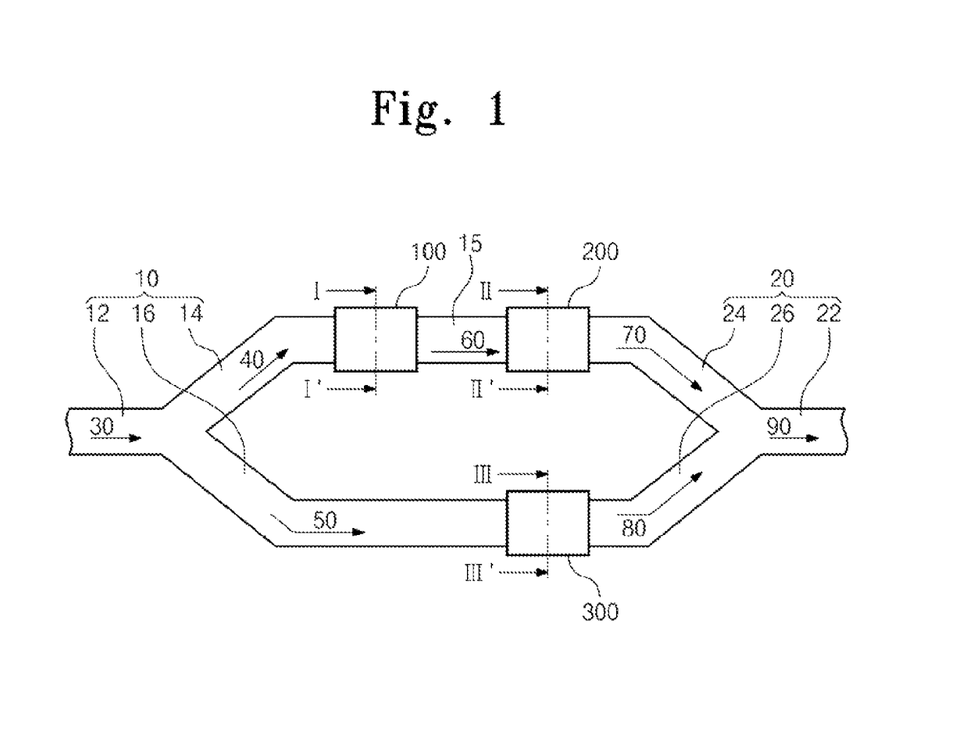
FIG. 1 is a plan view of an electro-optic device according to an embodiment of the prevent invention.

An electro-optic device according to an embodiment of the present invention will be described below. FIG. 1 is a plan view of an electro-optic device according to an embodiment of the prevent invention.

Referring to FIG. 1, an electro-optic device according to an embodiment of the present invention may include an input Y-branch 10, an output Y-branch 20, a connection optical waveguide 15, a first optical modulator 100, a second optical modulator 200, and a third optical modulator 300.

The input Y-branch 10 may include an input part 12, a first input branch 14, and a second input branch 16. The first input branch 14 and the second input branch 16 may extend from one end of the input part 12. The one end of the input part 12, one end of the first input branch 14, and one end of the second input branch 16 may be connected to each other.

The output Y-branch 20 may include an output part 22, a first output branch 24, and a second output branch 26. The first output branch 24 and the second output branch 26 may extend from one end of the output part 22. The one end of the output part 22, one end of the first output branch 24, and one end of the second output branch 26 may be connected to each other.

The first optical modulator 100 and the second optical modulator 200 may be connected in series between the first input branch 14 and the first output branch 24. The other end of the first input branch 14 may be connected to the first optical modulator 100. The first optical modulator 100 may be connected to the second optical modulator 200 in series through the connection optical waveguide 15. The second optical modulator 200 may be connected to the other end of the first output branch 24. The third optical modulator 300 may connect the other end of the second input branch 16 to the other end of the second output branch 26.

An optical modulation part of the first optical modulator 100 and an optical modulation part of the second optical modulator 200 may be connected in series through the connection optical waveguide 15. The second optical modulator 200 may have the same structure as the third optical modulator 300. The first optical modulator 100 modulates a phase of an optical signal inputted into the first optical modulator 100 by about 90 degrees, and the second and third optical modulators 200 and 300 perform AC-modulation of a phase of an optical signal inputted the second and third optical modulators 200 and 300, respectively.

An operation process of the electro-optic device according to an embodiment of the present invention will now be described. When an input optical signal 30 is inputted into the other end of the input part 12 of the input Y-branch 10, the input optical signal 30 may split into a first optical signal 40 and a second optical signal 50 at the one end of the input part 12. The first optical signal 40 may proceed into the first input branch 14, and the second optical signal 50 may proceed into the second input branch 16. The first optical signal 40 may have the same phase as the second optical signal 50.

The first optical signal 40 proceeding into the first input branch 14 is inputted into the first optical modulator 100. The first optical modulator 100 may modulate a phase of the first optical signal 40 by about 90 degrees to output a first modulation signal 60. The first modulation signal 60 and the second optical signal 50 may have a phase difference of about 90 degrees.

The first modulation signal 60 may pass through the connection optical waveguide 15 and be inputted into the second optical modulator 200. The second optical modulator 200 may modulate a phase of the first modulation signal 60 to output a second modulation signal 70. The second optical modulator 200 may perform AC-modulation of the first modulation signal 60 to output the second modulation signal 70. The second modulation signal 70 may proceed along the first output branch 24.

The second optical signal 50 proceeding into the second input branch 16 may be inputted into the third optical signal 300. The third optical modulator 300 may modulate a phase of the second optical signal 50 to output a third modulation signal 80. The third optical modulator 300 may perform AC-modulation of the second optical signal 50 to output the third modulation signal 80. The third modulation signal 80 may proceed along the second output branch 26.

The second modulation signal 70 proceeding along the first output branch 24 and the third modulation signal 80 proceeding along the second output branch 26 may be combined with each other to form an output optical signal 90. The output optical signal 90 may be outputted from the other end of the output part 22.

A phase of the optical signal proceeding from the first input branch 14 to the first output branch 24 may be modulated by about 90 degrees by the first optical modulator 100 and be AC-modulated by the second optical modulator 200. The optical signal proceeding from the second input branch 16 to the second output branch 26 may be AC-modulated by the third optical modulator 300. Thus, the optical signals AC-modulated by the second optical modulator 200 and the third optical modulator 300 may have a phase difference of about 90 degrees. As a result, the electro-optic device according to an embodiment of the present invention may be operated at a quadrature point. Therefore, quality of the output optical signal 90 may be superior. In addition, output characteristics of the electro-optic device according to an embodiment of the present invention may be stabilized.

Figure 2:
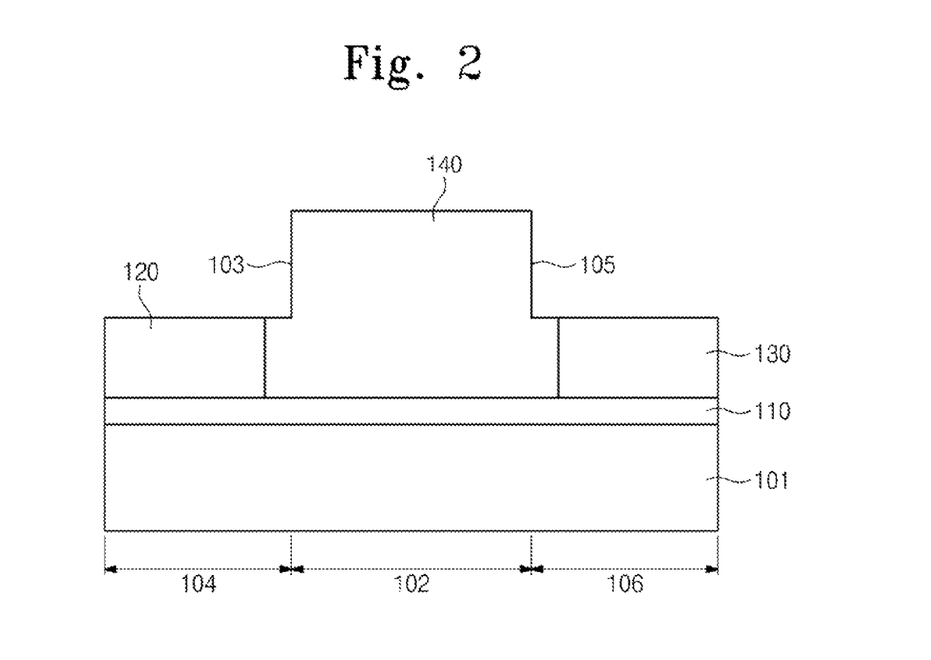
FIG. 2 is a sectional view of a first optical modulator according to an embodiment of the present invention.

The first optical modulator 100 included in the electro-optic device according to an embodiment of the present invention will now be described. FIG. 2 is a view of the first optical modulator included in the electro-optic device according to an embodiment of the present invention, and FIG. 2 is a sectional view taken along line I-I' of FIG. 1.

Referring to FIGS. 1 and 2, the first optical modulator 100 included in the electro-optic device according to an embodiment of the present invention may include an optical modulation part 102 and first and second recess parts 104 and 106 which are disposed on a substrate 101. The optical modulation part 102 may have a first sidewall 103 and a second sidewall 105 facing the first sidewall 103. The first recess part 104 may be connected to the first sidewall 103. The second recess part 106 may be connected to the second sidewall 105. The optical modulation part 102 may have a flat top surface. The top surface of the optical modulation part 102 may be parallel to that of the substrate 101. The optical modulation part 102 may be a region through which an optical signal passes. The first and second recess parts 104 and 106 may have top surfaces lower than that of the optical modulation part 102. The optical modulation part 102 may contact with the first and second recess parts 104 and 106 without a boundary therebetween.

The optical modulation part 102 may include an intrinsic semiconductor part 140 disposed on the substrate 101. The intrinsic semiconductor part 140 may be in an intrinsic state. The first recess part 104 may include a first conductive type first semiconductor part 120 and the intrinsic semiconductor part 140, which are disposed on the substrate 101. The second recess part 106 may include a second conductive type second semiconductor part 130 disposed on the substrate 101 and the intrinsic semiconductor part 140.

The intrinsic semiconductor part 140 may be disposed between the first semiconductor part 120 and the second semiconductor part 130. A junction surface between the first semiconductor part 120 and the intrinsic semiconductor part 140 may be non-parallel to the tap surface of the substrate 101. A junction surface between the second semiconductor part 130 and the intrinsic semiconductor part 140 may be non-parallel to the top surface of the substrate 101. The first semiconductor part 120 may be laterally spaced from the second semiconductor part 130 with the intrinsic semiconductor part 140 therebetween. The first semiconductor part 120, the intrinsic semiconductor part 140, and the second semiconductor part 130 may be sequentially laterally disposed on the substrate 101.

The first semiconductor part 120 may be doped with a first conductive type dopant. The second semiconductor part 130 may be doped with a second conductive type dopant. For example, the first semiconductor part 120 may be doped with a P-type dopant, and the second semiconductor part 130 may be doped with an N-type dopant. On the other hand, the first semiconductor part 120 may be doped with an N-type dopant, and the second semiconductor part 130 may be doped with a P-type dopant.

The first semiconductor pan 120 may be spaced from the optical modulation part 102 by the intrinsic semiconductor part 140 included in the first recess part 104. The second semiconductor part 130 may be spaced from the optical modulation part 102 by the intrinsic semiconductor part 140 included in the second recess part 106.

The first optical modulator 100 may include a PIN diode including the intrinsic semiconductor part 140, the first semiconductor part 120, and the second semiconductor part 130. A refractive index of the optical modulation part 102 is varied according to a density of carriers within the optical modulation part 102. For example, as the density of the carriers within the optical modulation part 102 increases, the refractive index of the optical modulation part 102 may increase. A drive current amount of the PIN diode may be adjusted to adjust the density of the carriers within the optical modulation part 102. The refractive index of the optical modulation part 102 may be controlled to shaft a phase of the optical signal transmitting the optical modulation part 102. For example, when a forward DC voltage is applied to the PIN diode, the phase of the input optical signal may be constantly modulated by about 90 degrees. The PIN diode may have a refractive index variation greater than that of a PN diode. Thus, it may be advantageous that the phase of the input optical signal is constantly modulated by about 90 degrees using the PIN diode when compared that the phase of the input optical signal is modulated using the PN diode.

A cladding layer 110 may be disposed between the optical modulation part 102 and the substrate 101. The cladding layer 110 may be disposed between the substrate 101 and the recess parts 104 and 106. The cladding layer 110 may be disposed on an entire surface of the substrate 101. The cladding layer 110 may contain a material having a refractive index different from that of the optical modulation part 102. For example, the cladding layer 110 may include a silicon oxide layer. The cladding layer 110 may include a buried oxide layer of a SOI substrate. On the other hand, oxygen ions may be ion-injected into a bulk semiconductor substrate to a predetermined depth using an ion implantation process to form the cladding layer 110. The oxygen ion implantation process may be selectively performed on a portion at which the optical waveguide will be formed later. When the substrate 101 is formed of silicon and the cladding layer 110 includes the silicon oxide layer, a vertical concentration of the silicon oxide may have a Gaussian distribution.

Figure 3A:
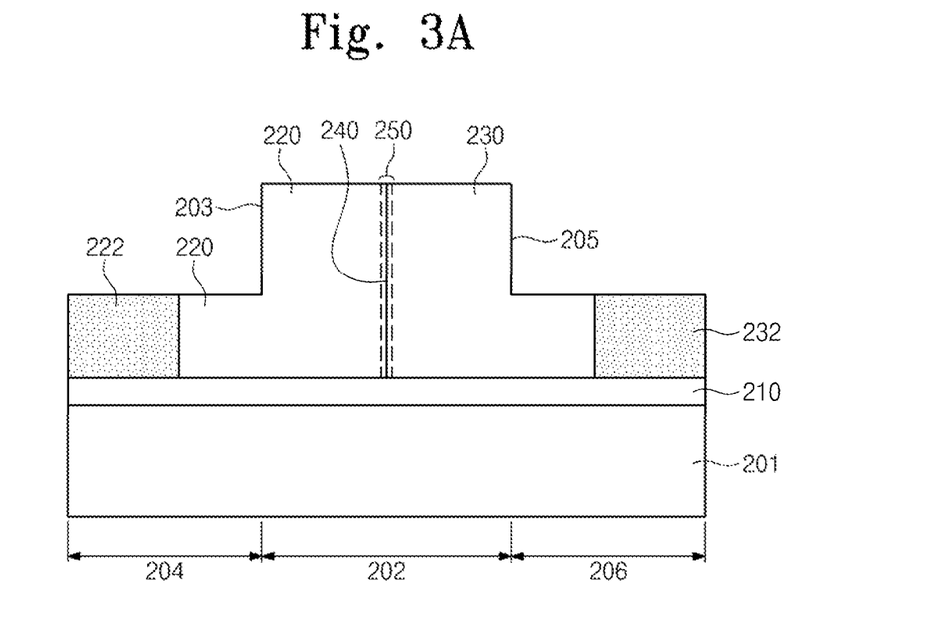
FIGS. 3A and 3B are sectional views of a second optical modulator and a third optical modulator according to an embodiment of the present invention, respectively.

The second and third optical modulators 200 and 300 included in the electro-optic device according to an embodiment of the present invention will be described below. FIG. 3A is a sectional view of the second and third optical modulators included in the electro-optic device according to an embodiment of the present invention. FIG. 3A is a sectional view taken along lines II-II' and III-III' of FIG. 1.

Referring to FIGS. 1 and 3A, the second and third optical modulators 200 and 300 may have the same structure as each other. The second and third optical modulators 200 and 300 may include an optical modulation part 202 and first and second recess parts 204 and 206, which are disposed on a substrate 201. The optical modulation part 202 may have a first sidewall 203 and a second sidewall 205 facing the first sidewall 203. The first recess part 204 may be connected to the first sidewall 203. The second recess part 206 may be connected to the second sidewall 205. The optical modulation part 202 may have a flat top surface. The top surface of the optical modulation part 202 may be parallel to that of the substrate 201. The optical modulation part 202 may be a region through which an optical signal passes. The first and second recess parts 204 and 206 may have top surfaces lower than that of the optical modulation part 202. The optical modulation part 202 may contact the first and second recess parts 204 and 206 without a boundary therebetween.

The optical modulation part 202 may include a first conductive type first semiconductor part 220, a second conductive type second semiconductor part 230, and a depletion layer 250 formed by a junction between the first semiconductor part 220 and the second semiconductor part 230, which are disposed on the substrate 201. A junction surface 240 between the first semiconductor part 220 and the second semiconductor part 230 may be non-parallel to the top surface of the substrate 201. The junction surface 240 may cross the top surface of the substrate 201. The junction surface 240 may be perpendicular to the top surface of the substrate 201. A distance between the junction surface 240 and the first sidewall 203 may be equal to that between the junction surface 240 and the second sidewall 205.

The first semiconductor part 220 may be doped with a first conductive type dopant. The second semiconductor part 230 may be doped with a second conductive type dopant. For example, the first semiconductor part 220 may be doped with a P-type dopant, and the second semiconductor part 230 may be doped with an N-type dopant. On the other hand, the first semiconductor part 220 may be doped with an N-type dopant, and the second semiconductor part 230 may be doped with a P-type dopant.

The first recess part 204 may include a first conductive type first highly concentrated semiconductor part 222. The first conductive type dopant may be further doped into the first semiconductor part 220 to form the first highly concentrated semiconductor part 222. The first highly concentrated semiconductor part 222 may be spaced from the optical modulation part 202 by the first semiconductor part 220 included in the first recess part 204.

The second recess part 206 may include a second conductive type second highly concentrated semiconductor part 232. The second conductive type dopant may be further doped into the second semiconductor part 230 to form the second highly concentrated semiconductor part 232. The second highly concentrated semiconductor part 232 may be spaced from the optical modulation part 202 by the second semiconductor part 230 included in the second recess part 206.

The second and third optical modulators 200 and 300 may include a PN diode including the first semiconductor part 220, the second semiconductor part 230, and the depletion layer 250. A refractive index of the optical modulation part 202 is varied according to a density of carriers within the optical modulation part 202. For example, as the density of the carriers within the optical modulation part 202 increases, the refractive index of the optical modulation part 202 may increase. The density of the carriers within the optical modulation part 202 may be adjusted by adjusting a reverse bias voltage applied to the PN diode. For example, when the first conductive type is an N-type and the second conductive type is a P-type, a voltage applied to the first semiconductor part 220 may be greater than that applied to the second semiconductor part 230. When a reverse bias voltage is applied to the depletion layer 250, a width of the depletion layer 250 may become wide, and the density of the carriers within the optical modulation part 202 may be reduced. The reverse bias voltage may pass through the first and second highly concentrated semiconductor parts 222 and 232, and be respectively applied to the first semiconductor part 220 and the second semiconductor part 230.

The refractive index of the optical modulation part 202 may be controlled to shaft a phase of an optical signal transmitting the optical modulation part 202. For example, when the reverse bias voltage is applied to the PN diode to perform AC-modulation of the phase of the input optical signal. The PN diode to which the reverse bias voltage is applied may have a carrier concentration variation speed greater than that of a PIN diode to which a forward voltage is applied. Thus, it may be advantageous that the phase of the input optical signal is AC-modulated using the PN diode when compared that the phase of the input optical signal is modulated using the PIN diode.

A cladding layer 210 may be disposed between the optical modulation part 202 and the substrate 201. The cladding layer 210 may be disposed between the substrate 201 and the recess parts 204 and 206. The cladding layer 210 may be disposed on an entire surface of the substrate 201. The cladding layer 210 may contain a material having a refractive index different from that of the optical modulation part 202. For example, the cladding layer 210 may include a silicon oxide layer. The cladding layer 210 may include a buried oxide layer of a SOI substrate. On the other hand, oxygen ions may be ion-injected into a bulk semiconductor substrate to a predetermined depth using an ion implantation process to form the cladding layer 210. The oxygen ion implantation process may be selectively performed on a portion at which the optical waveguide will be formed later. When the substrate 201 is formed of silicon and the cladding layer 210 includes the silicon oxide layer, a vertical concentration of the silicon oxide may have a Gaussian distribution.

Figure 3B:
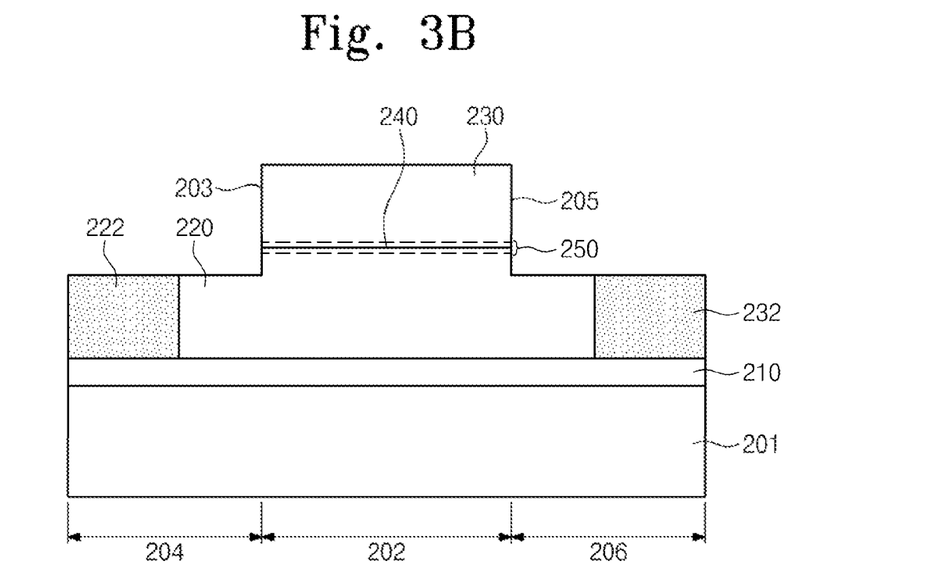

The second and third optical modulators 200 and 300 included in the electro-optic device according to a modified example of an embodiment of the present invention will be described below. FIG. 3B is a sectional view of the second and third optical modulators included in the electro-optic device according to a modified example of an embodiment of the present invention. FIG. 3B is a sectional view taken along lines II-II' and III-III' of FIG. 1.

Referring to FIGS. 1 and 3B, the second and third optical modulators 200 and 300 may have the same structure as each other. The second and third optical modulators 200 and 300 may include an optical modulation part 202 and first and second recess parts 204 and 206, which are disposed on a substrate 201. The first and second recess parts 204 and 206 are connected to first and second sidewalls 203 and 205, respectively. The first and second recess parts 204 and 206 may have top surfaces lower than that of the optical modulation part 202. The optical modulation part 202 may contact the first and second recess parts 204 and 206 without a boundary therebetween.

The optical modulation part 202 may include a first conductive type first semiconductor part 220, a second conductive type second semiconductor part 230, and a depletion layer 250 formed by a junction between the first semiconductor part 220 and the second semiconductor part 230, which are disposed on the substrate 201. The first semiconductor part 220 and the second semiconductor part 230 may be sequentially stacked on the substrate 201. A junction surface 240 between the first semiconductor part 220 and the second semiconductor part 230 may be parallel to the top surface of the substrate 201. A distance between the junction surface 240 and a top surface of the optical modulation part 202 may be equal to that between the junction surface 240 and a bottom surface of the optical modulation part 202.

The first recess part 204 may include a first conductive type first highly concentrated semiconductor part 222. The first conductive type dopant may be further doped into the first semiconductor part 220 to form the first highly concentrated semiconductor part 222. The first highly concentrated semiconductor part 222 may be spaced from the optical modulation part 202 by the first semiconductor part 220 included in the first recess part 204.

The second recess part 206 may include a second conductive type second highly concentrated semiconductor part 232. The second conductive type dopant may be further doped into the second semiconductor part 230 to form the second highly concentrated semiconductor part 232. The second highly concentrated semiconductor part 232 may be spaced from the optical modulation part 202 by the first semiconductor part 220 included in the second recess part 206.

A cladding layer 210 may be disposed between the optical modulation part 202 and the substrate 201. The cladding layer 210 may be disposed between the substrate 201 and the recess parts 204 and 206. The cladding layer 210 may include a buried oxide layer of a SOI substrate. On the other hand, oxygen ions may be ion injected into a bulk semiconductor substrate to a predetermined depth using an ion implantation process to form the cladding layer 210. The oxygen ion implantation process may be selectively performed on a portion at which the optical waveguide will be formed later.

Figure 4A:
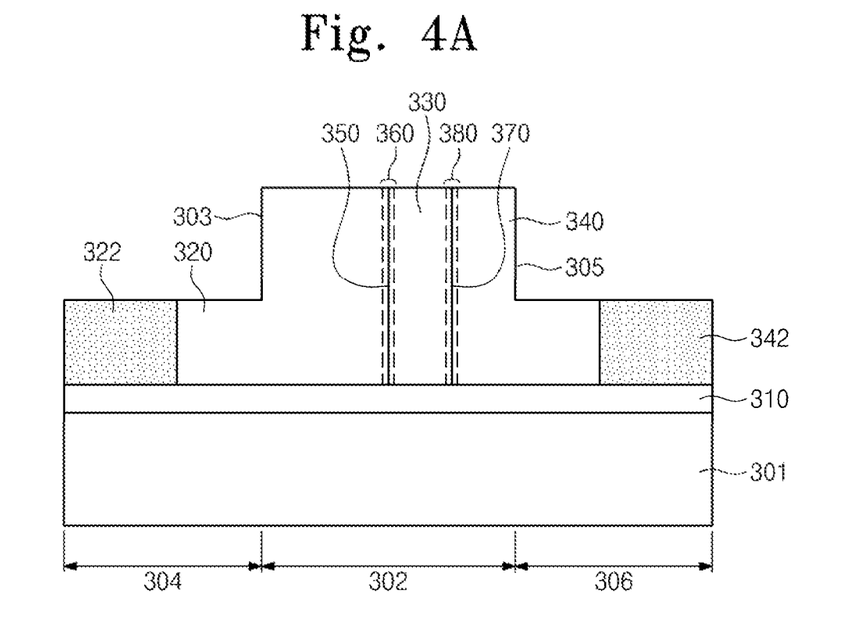
FIGS. 4A and 4B are sectional views of a second optical modulator and a third optical modulator according to another embodiment of the present invention, respectively.

Second and third optical modulators 200 and 300 included in an electro-optic device according to another embodiment of the present invention will be described below. FIG. 4A is a sectional view of the second and third optical modulators included in the electro-optic device according to another embodiment of the present invention. FIG. 4A is a sectional view taken along lines II-II' and III-III' of FIG. 1.

Referring to FIGS. 1 and 4A, the second and third optical modulators 200 and 300 may have the same structure as each other. The second and third optical modulators 200 and 300 may include an optical modulation part 302 and first and second recess parts 304 and 306, which are disposed on a substrate 301. The optical modulation part 302 may have a first sidewall 303 and a second sidewall 305 facing the first sidewall 303. The first recess part 304 may be connected to the first sidewall 303. The second recess part 306 may be connected to the second sidewall 305. The optical modulation part 102 may have a flat top surface. The top surface of the optical modulation part 302 may be parallel to that of the substrate 301. The optical modulation part 302 may be a region through which an optical signal passes. The first and second recess parts 304 and 306 may have top surfaces lower than that of the optical modulation part 302. The optical modulation part 302 may contact the first and second recess parts 304 and 306 without a boundary therebetween.

The optical modulation part 302 may include a first conductive type first semiconductor part 320, a second conductive type second semiconductor part 330, and a first conductive type third semiconductor part 340. The first semiconductor part 320 and the third semiconductor part 340 may be spaced from each other with the second semiconductor part 330 therebetween. The first semiconductor part 320, the second semiconductor part 330, and the third semiconductor part 340 may be sequentially laterally disposed spaced from each other on the substrate 301.

The optical modulation part 302 may include a first depletion layer 360 formed by a junction between the first semiconductor part 320 and the second semiconductor part 330. The optical modulation part 302 may include a second depletion layer 380 formed by a junction between the second semiconductor part 330 and the third semiconductor part 340. The depletion layers 360 and 380 may have PN junction structures.

A first junction surface 350 between the first semiconductor part 320 and the second semiconductor part 330 may be non-parallel to the top surface of the substrate 301. A second junction surface 370 between the second semiconductor part 330 and the third semiconductor part 340 may be non-parallel to the top surface of the substrate 301. The junction surfaces 350 and 370 may cross the top surface of the substrate 301. The junction surfaces 350 and 370 may be perpendicular to the top surface of the substrate 301.

When the junction surfaces 350 and 370 are perpendicular to the top surface of the substrate 301, a distance between the first junction surface 350 and the first sidewall 303 may be equal to that between the first junction surface 350 and the second sidewall 305. A reverse bias voltage may be applied to the first junction surface 350. For example, when the first conductive type is an N-type and the second conductive type is a P-type, a voltage applied to the first semiconductor part 320 may be greater than that applied to the second semiconductor part 330. When the reverse bias voltage may be applied to the first junction surface 350, a width of the first depletion layer 360 may become wide, and a density of carriers within the optical modulation part 302 may be reduced.

The first semiconductor part 320 and the third semiconductor part 340 may be doped with a first conductive type dopant. The second semiconductor part 330 may be doped with a second conductive type dopant. For example, the first semiconductor part 320 and the third semiconductor part 340 may be doped with a P-type dopant, and the second semiconductor part 330 may be doped with an N-type dopant. On the other hand, the First semiconductor part 320 and the third semiconductor part 340 may be doped with an N-type dopant, and the second semiconductor part 330 may be doped with a P-type dopant.

The first recess part 304 may include a first conductive type first highly concentrated semiconductor part 322. The first conductive type dopant may be further doped into the first semiconductor part 320 to form the first highly concentrated semiconductor part 322. The first highly concentrated semiconductor part 322 may be spaced from the optical modulation part 302 by the first semiconductor part 320 included in the first recess part 304.

The second recess part 306 may include a first conductive type second highly concentrated semiconductor part 342. The second conductive type dopant may be further doped into the second semiconductor part 330 to form the second highly concentrated semiconductor part 342. The second highly concentrated semiconductor part 342 may be spaced from the optical modulation part 302 by the third semiconductor part 340 included in the second recess part 306.

The second and third optical modulators 200 and 300 may include a diode having a PNP or NPN structure including the first semiconductor part 320, the second semiconductor part 330, and the third semiconductor part 340. A refractive index of the optical modulation part 302 is varied according to the density of the carriers within the optical modulation part 302. For example, as the density of the carriers within the optical modulation part 302 increases, the refractive index of the optical modulation part 302 may increase. The reverse bias voltage applied to the PNP or NPN diode may be adjusted to adjust the density of the carriers within the optical modulation part 302.

A refractive index of the optical modulation part 302 may be controlled to shaft a phase of an optical signal transmitting the optical modulation part 302. For example, the reverse voltage may be applied to the PNP or NPN diode to perform AC-modulation of the phase of the input optical signal. The PNP or NPN diode to which the reverse bias voltage is applied may have a carrier concentration variation speed greater than that of a PIN diode to which a forward voltage is applied. Thus, it may be advantageous that the phase of the input optical signal is AC-modulated using the NPN or PNP diode when compared that the phase of the input optical signal is modulated using the PIN diode.

Also, the second and third optical modulators 200 and 300 may include a PN junction capacitor connected in series and formed by the first depletion layer 360 and the second depletion layer 380. As a result, a depletion capacitance within the optical modulation part 302 may be reduced to improve an operation speed.

A cladding layer 310 may be disposed between the optical modulation part 302 and the substrate 301. The cladding layer 310 may be disposed between the substrate 301 and the recess parts 304 and 306. The cladding layer 310 may be disposed on an entire surface of the substrate 301. The cladding layer 310 may contain a material having a refractive index different from that of the optical modulation part 302. For example, the cladding layer 310 may include a silicon oxide layer. The cladding layer 310 may include a buried oxide layer of a SOI substrate. On the other hand, oxygen ions may be ion-injected into a bulk semiconductor substrate to a predetermined depth using an ion implantation process to form the cladding layer 310. The oxygen ion implantation process may be selectively performed on a portion at which the optical waveguide will be formed later. When the substrate 301 is formed of silicon and the cladding layer 310 includes the silicon oxide layer, a vertical concentration of the silicon oxide layer may have a Gaussian distribution.

Figure 4B:
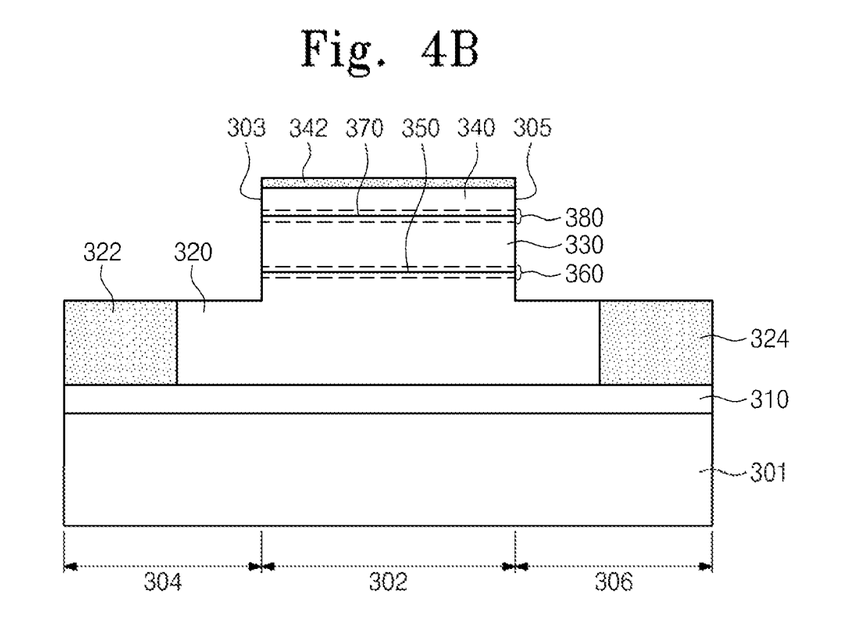

The second and third optical modulators 200 and 300 included in an electro-optic device according to a modified example of another embodiment of the present invention will be described below. FIG. 4B is a sectional view of the second and third optical modulators included in the electro-optic device according to a modified example of another embodiment of the present invention. FIG. 4B is a sectional view taken along lines II-II' III-III' and of FIG. 1.

Referring to FIGS. 1 and 4B, the second and third optical modulators 200 and 300 may have the same structure as each other. The second and third optical modulators 200 and 300 may include an optical modulation part 302 and first and second recess parts 304 and 306, which are disposed on a substrate 301 the first and second recess parts 304 and 306 are connected to first and second sidewalls 303 and 305, respectively. The first and second recess parts 304 and 306 may have top surfaces lower than that of the optical modulation part 302. The optical modulation part 302 may contact the first and second recess parts 304 and 306 without a boundary therebetween.

The optical modulation part 302 may include a first conductive type first semiconductor part 320, a second conductive type second semiconductor part 330, and a first conductive type third semiconductor part 340. The first semiconductor part 320 and the third semiconductor part 340 may be spaced from each other with the second semiconductor part 330 therebetween. The first semiconductor part 320, the second semiconductor part 330, and the third semiconductor part 340 may be sequentially stacked on the substrate 301. A first junction surface 350 between the first semiconductor part 320 and the second semiconductor part 330 and a second junction surface 370 between the second semiconductor part 330 and the third semiconductor part 340 may be parallel to the top surface of the substrate 301.

The optical modulation part 302 may include a first depletion layer 360 formed by a junction between the first semiconductor part 320 and the second semiconductor part 330 and a second depletion layer 380 formed by a junction between the second semiconductor part 330 and the third semiconductor part 340.

The optical modulation part 302 may include a first conductive type first highly concentrated semiconductor part 342 disposed on the third semiconductor part 340. The first conductive type dopant may be further doped into the third semiconductor part 340 to form the first highly concentrated semiconductor part 342.

When the junction surfaces 350 and 370 are parallel to the top surface of the substrate 301, a distance between the first junction surface 350 and a top surface of the optical modulation part 302 may be equal to that between the first junction surface 350 and a bottom surface of the optical modulation part 302. A reverse bias voltage may be applied to the first junction surface 350.

The first recess part 304 may include a first conductive type second highly concentrated semiconductor part 322. The second conductive type dopant may be further doped into the first semiconductor part 320 to form the second highly concentrated semiconductor part 322. The second highly concentrated semiconductor part 322 may be spaced from the optical modulation part 302 by the first semiconductor part 320 included in the first recess part 304.

The second recess part 306 may include a first conductive type third highly concentrated semiconductor part 324. The first conductive type dopant may be further doped into the third semiconductor part 340 to form the third highly concentrated semiconductor part 324. The third highly concentrated semiconductor part 324 may be spaced from the optical modulation part 302 by the first semiconductor part 320 included in the second recess part 306.

A cladding layer 310 may be disposed between the optical modulation part 302 and the substrate 301. The cladding layer 310 may be disposed between the substrate 301 and the recess parts 304 and 306. The cladding layer 310 may include a buried oxide layer of a SOI substrate. On the other hand, oxygen ions may be ion-injected into a bulk semiconductor substrate to a predetermined depth using an ion implantation process to form the cladding layer 310. The oxygen ion implantation process may be selectively performed on a portion at which the optical waveguide will be formed later.

According to an embodiment and another embodiment of the present invention, as illustrated in FIG. 1, the first optical modulator 100 and the second optical modulator 200 are sequentially connected in series between the first input branch 14 and the first output branch 24.

On the other hand, according to another embodiment of the present invention, the second optical modulator 200 and the first optical modulator 100 may be sequentially connected in series between the first input branch 14 and the first output branch 24. In this case, the first optical signal 40 may be AC-modulated while passing through the second optical modulator 200, and then the phase of the first optical signal 40 may be modulated by about 90 degrees by the first optical modulator 100.

Figure 5:
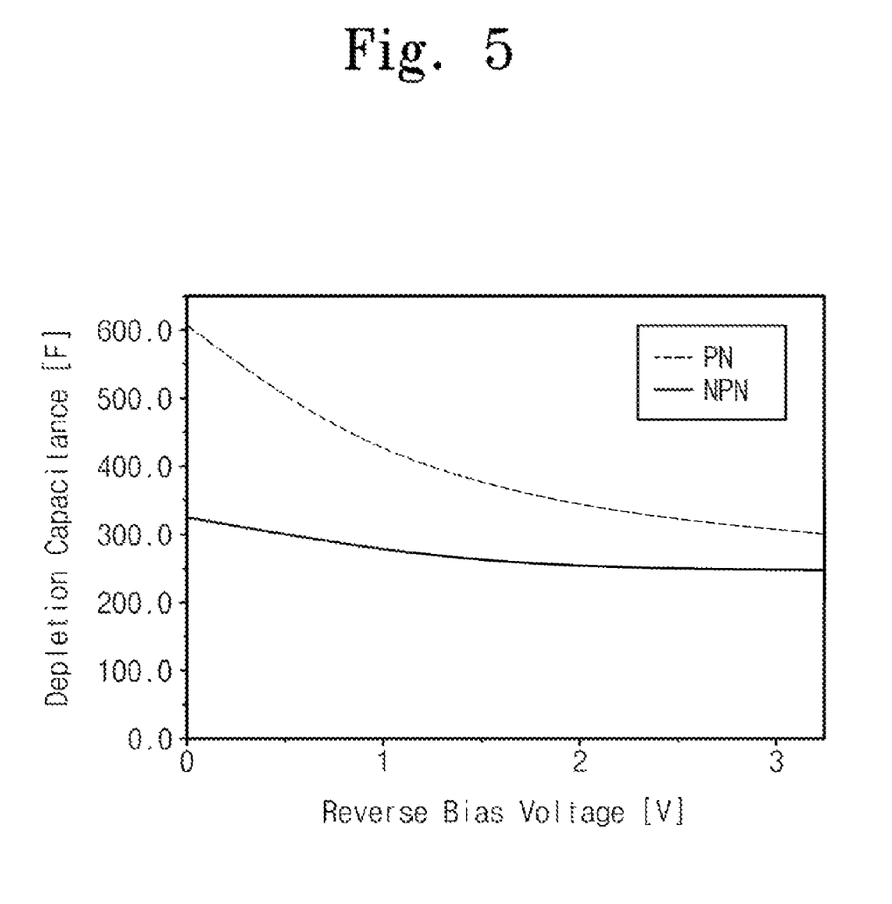
FIG. 5 is a graph illustrating a variation characteristic of a depletion capacitance of the optical modulation part according to another embodiment of the prevent invention.

A variation characteristic of a depletion capacitance of the optical modulation part according to another embodiment of the present invention and its a modified example will be described below. FIG. 5 is a graph illustrating a variation characteristic of a depletion capacitance of the optical modulation part according to another embodiment of the prevent invention.

Referring to FIG. 5, the graph illustrates a variation according to a revere bias voltage of a depletion capacitance of an optical modulator including P-type and N-type semiconductor layers, and a depletion capacitance of an optical modulator including N-type, P-type, and N-type semiconductor layers. A horizontal axis represents an intensity of the reverse bias voltage, and a vertical axis represents a capacitance (dot line) of a PN semiconductor layer and a capacitance (solid line) of an NPN semiconductor layer.

In this graph, the N-type semiconductor layer has a doping concentration of about $10^{19}$ cm$^{-3}$, and the P-type semiconductor layer has a doping concentration of about $10^{18}$ cm$^{-3}$. As shown in graph, it is seen that the NPN semiconductor layer has a capacitance less than that of the PN semiconductor layer. As the reverse bias voltage gradually decreases, a difference between the depletion capacitance of the NPN semiconductor layer and the depletion capacitance of the PN semiconductor layer significantly increases.

According to the embodiments of the present invention, the phase of the optical signal inputted through the first optical modulator having the optical modulation pan that is in the intrinsic state can be modulated by about 90 degrees, and the phase of the optical signal inputted through the second and third optical modulators can be AC-modulated to provide the electro-optic device optimized for high-speed and high-efficiency.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electro-optic device comprising:
   an input Y-branch comprising a first input branch and a second input branch;
   an output Y-branch comprising a first output branch and a second output branch;
   a first optical modulator and a second optical modulator connected in series between the first input branch and the first output branch; and
   a third optical modulator connecting the second input branch to the second output branch,
   wherein the first optical modulator comprises a PIN diode, and each of the second optical modulator and the third optical modulator comprises a PN diode.

2. The electro-optic device of claim 1, wherein the first optical modulator comprises:
   an optical modulation part comprising an intrinsic semiconductor part disposed on a substrate; and
   a first recess part and a second recess part connected to both sidewalls of the optical modulation part, respectively, the first and second recess parts having top surfaces lower than a top surface of the optical modulation part,
   wherein the first recess part comprises a first conductive type first semiconductor part, and the second recess part comprises a second conductive type second semiconductor part,
   wherein the intrinsic semiconductor part contacts a first conductive type doped region and a second conductive type doped region.

3. The electro-optic device of claim 2, wherein, when operated, a forward DC voltage is applied between the first semiconductor part and the second semiconductor part.

4. The electro-optic device of claim 1, wherein the second optical modulator and the third optical modulator have the same structure as each other.

5. The electro-optic device of claim 4, wherein the second optical modulator comprises:
   an optical modulation part comprising a first conductive type first semiconductor part, a second conductive type second semiconductor part, and a depletion layer formed by a junction between the first semiconductor part and the second semiconductor part, which are disposed on a substrate; and
   a first recess part and a second recess part connected to a first sidewall and a second sidewall of the optical modulation part, respectively, the first and second recess parts having top surfaces lower than a top surface of the optical modulation part.

6. The electro-optic device of claim 5, wherein a reverse bias voltage is applied between the first semiconductor part and the second semiconductor part.

7. The electro-optic device of claim 5, wherein a junction surface between the first semiconductor part and the second semiconductor part is non-parallel to a top surface of the substrate.

8. The electro-optic device of claim 7, wherein the junction surface is perpendicular to the substrate, and a distance between the junction surface and the first sidewall is equal to that between the junction surface and the second sidewall.

9. The electro-optic device of claim 5, wherein the first semiconductor part and the second semiconductor part are sequentially stacked on the substrate, and a junction surface between the first semiconductor part and the second semiconductor part is parallel to the substrate.

10. The electro-optic device of claim 9, wherein a distance between the junction surface and the top surface of the optical modulation part is equal to that between the junction surface and a bottom surface of the optical modulation part.

11. The electro-optic device of claim 5, wherein the optical modulation part further comprises:
   a first conductive type third semiconductor part spaced from the first semiconductor part with the second semiconductor part therebetween; and
   an additional depletion layer formed by a junction between the third semiconductor part and the second semiconductor part.

12. The electro-optic device of claim 11, wherein a first junction surface between the first semiconductor part and the second semiconductor part and a second junction surface between the second semiconductor part and the third semiconductor part are non-parallel to a top surface of the substrate.

13. The electro-optic device of claim 12, wherein the first junction surface and the second junction surface are perpendicular to the substrate,
   a reverse bias voltage is applied to any one junction surface of the first junction surface and the second junction surface, and
   a distance between the any one junction surface and the first sidewall is equal to that between the any one junction surface and the second sidewall.

14. The electro-optic device of claim 11, wherein the first semiconductor part, the second semiconductor part, and the third semiconductor part are sequentially stacked on the substrate, and a first junction surface between the first semiconductor part and the second semiconductor part and a second junction surface between the second semiconductor part and the third semiconductor part are parallel to the substrate.

15. The electro-optic device of claim 14, wherein a reverse bias voltage is applied to any one junction surface of the first junction surface and the second junction surface, and a distance between the any one junction surface and the top surface of the optical modulation part is equal to that between the any one junction surface and a bottom surface of the optical modulation part.

16. The electro-optic device of claim 1, further comprising a first optical signal proceeding from the first input branch to the first output branch and a second optical signal proceeding from the second input branch to the second output branch, the first and second optical signals splitting at the input Y-branch,
   wherein, when operated, the first optical modulator modulates a phase of the first optical signal by about 90 degrees.

17. The electro-optic device of claim 1, wherein a optical modulation part of the first optical modulator and a optical modulation part of the second optical modulator are connected in series.

18. The electro-optic device of claim 1, wherein each of the first, second, and third optical modulator comprises:
   an optical modulation part disposed on a substrate;
   a pair of recess parts connected to both sidewalls of the optical modulation part, respectively, the pair of recess parts having top surfaces lower than that of the optical modulation part; and
   a cladding layer disposed between the optical modulation part and the substrate,
   wherein a refractive index of the optical modulation part is varied by a concentration of carriers within the optical modulation part.

* * * * *